United States Patent Office 3,544,340
Patented Dec. 1, 1970

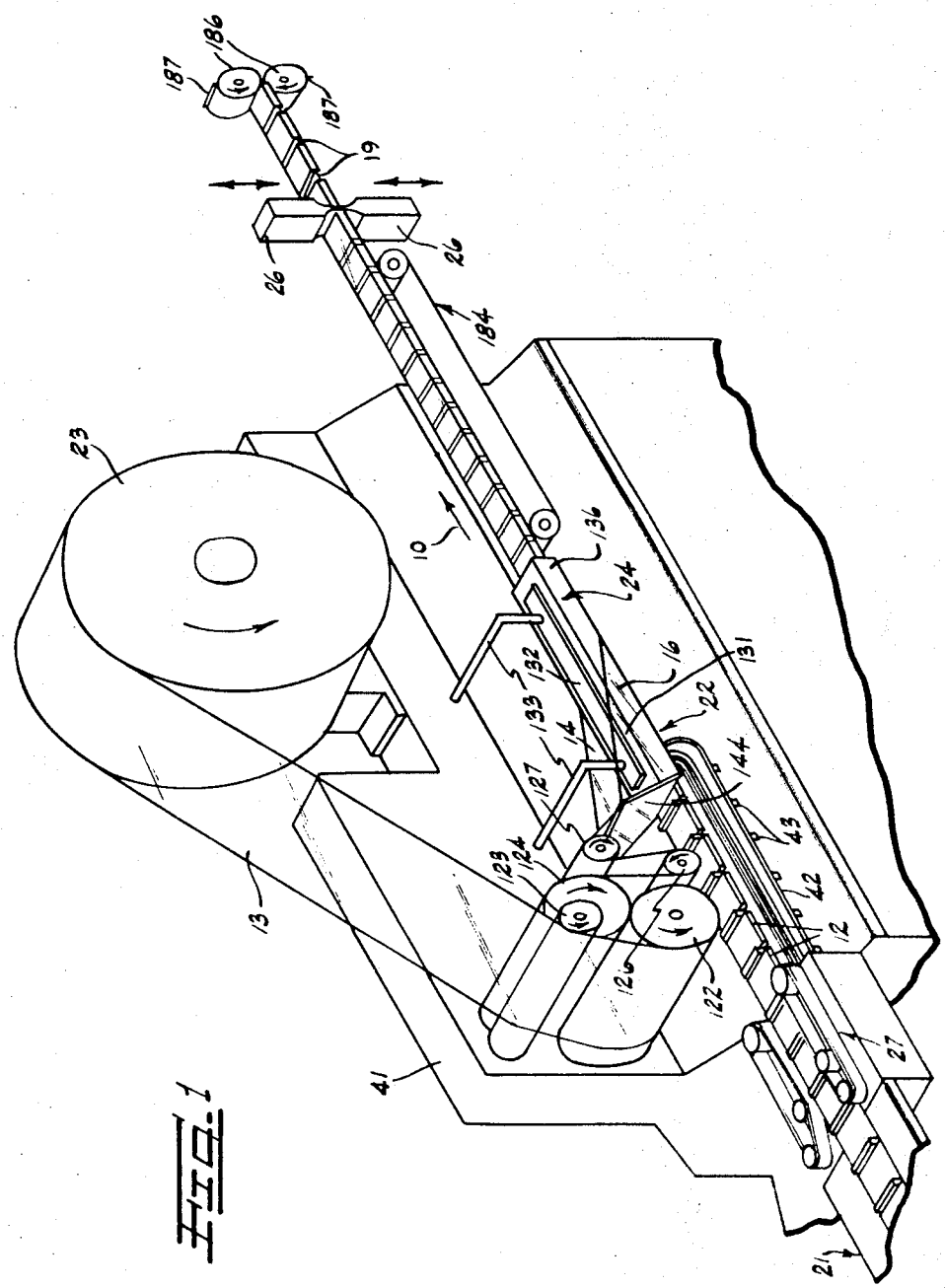

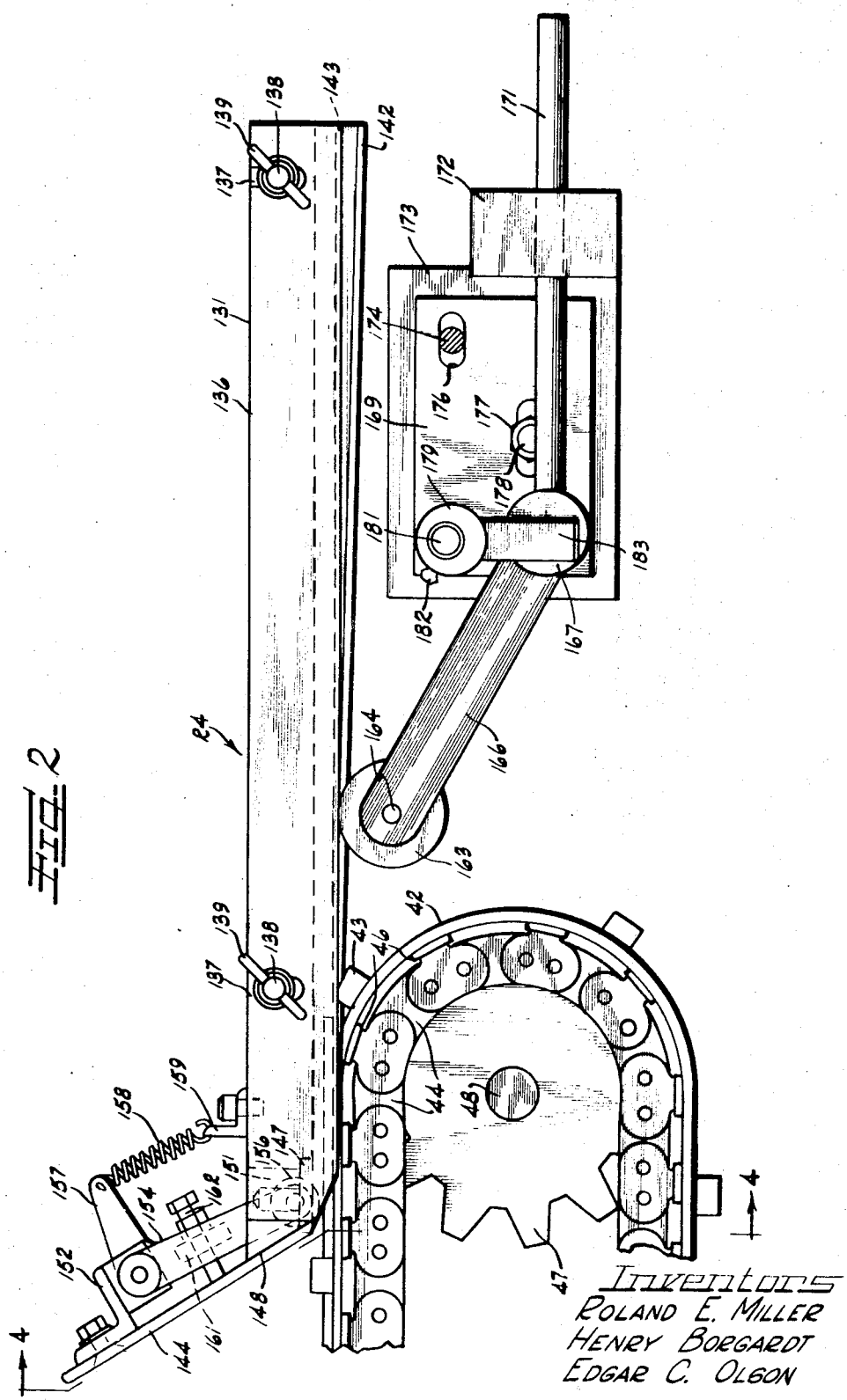

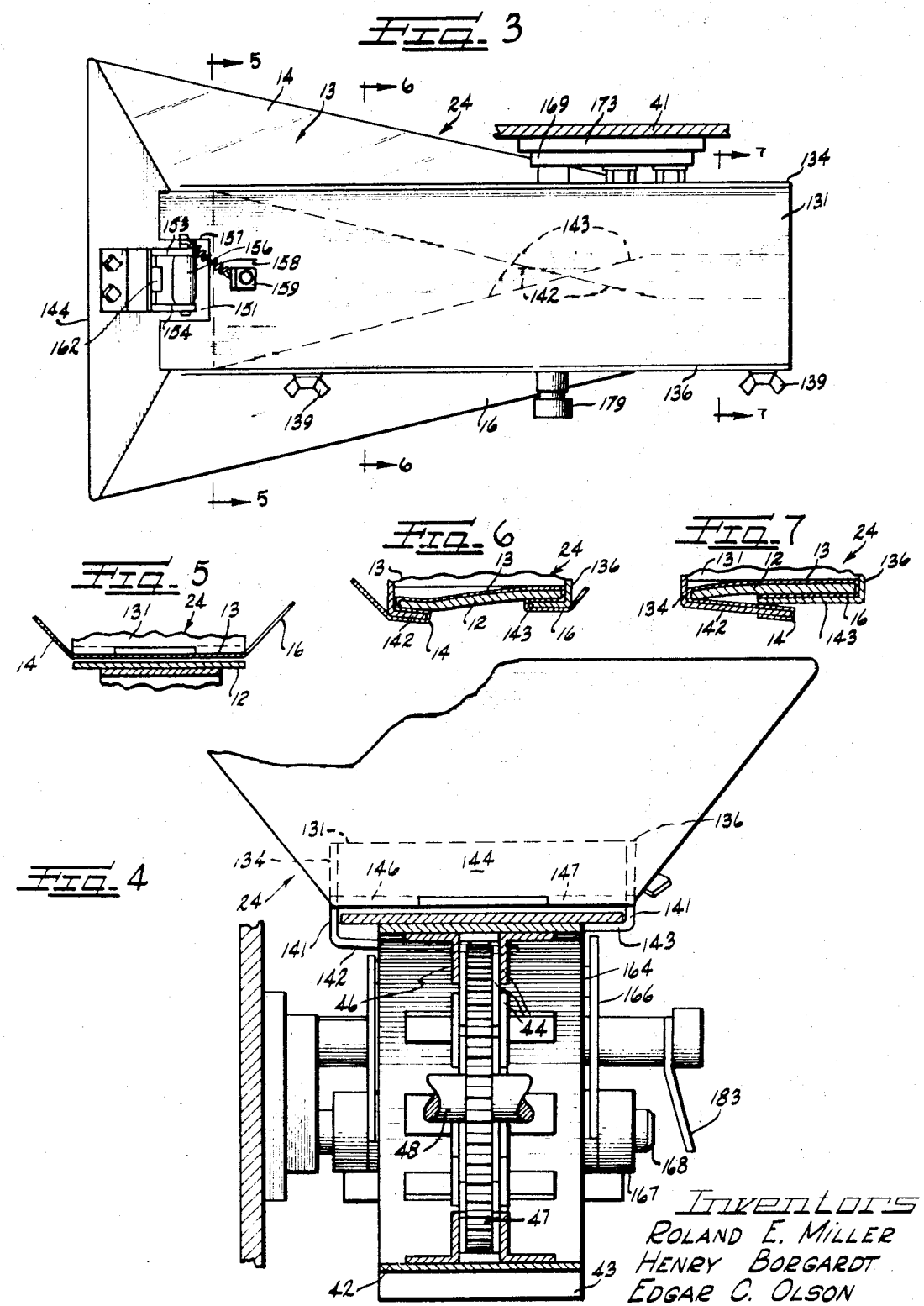

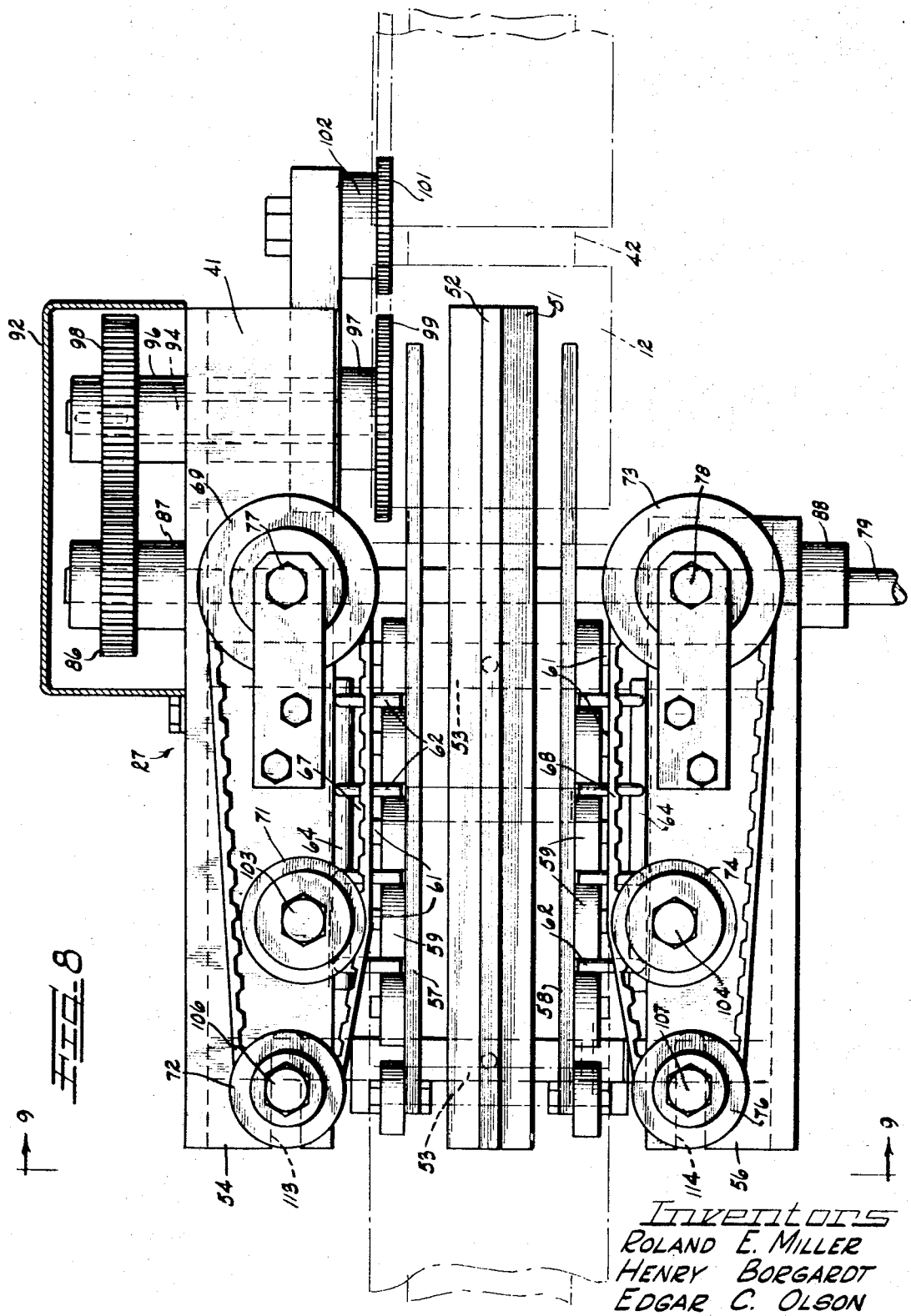

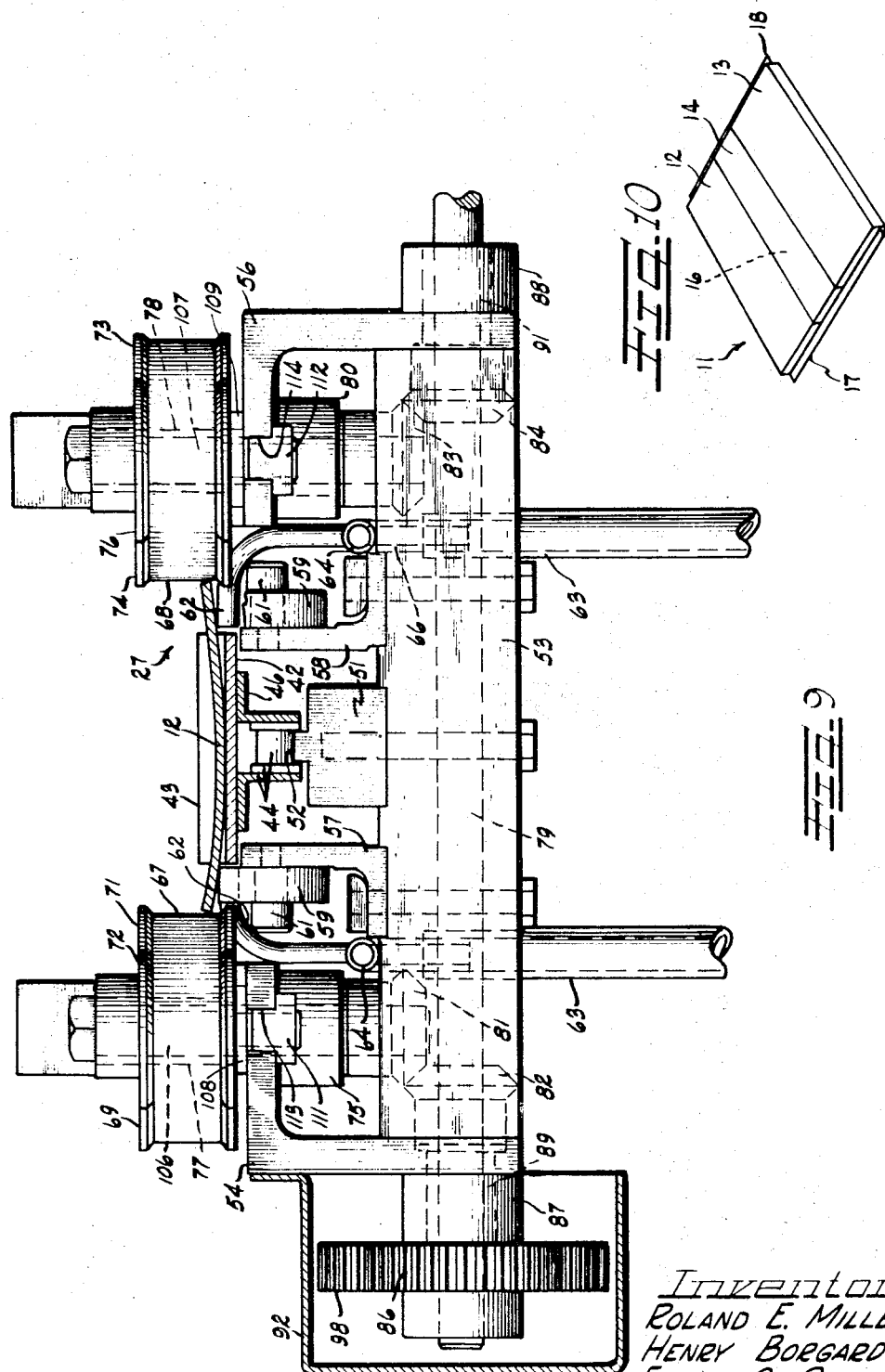

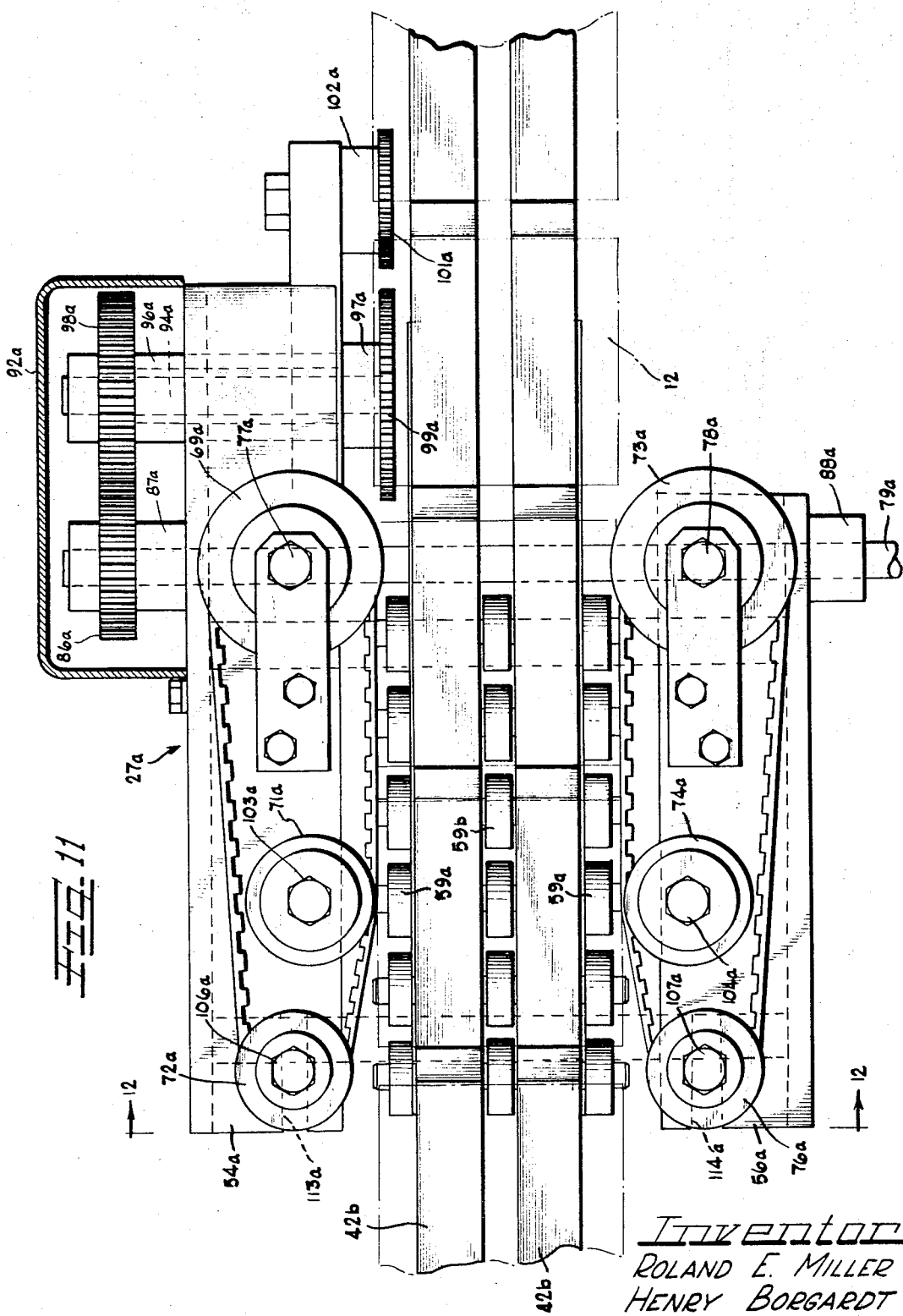

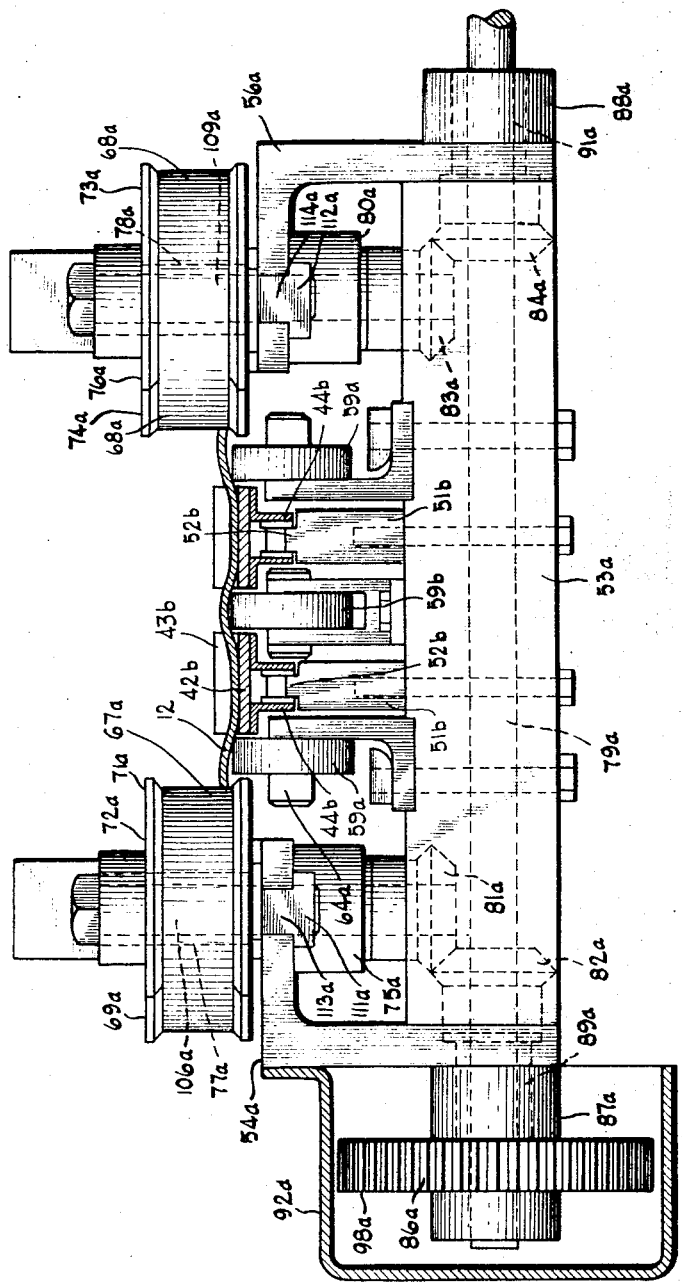

3,544,340
CHEESE PACKAGING METHOD AND APPARATUS
Roland E. Miller, Orangeville, Henry Borgardt, Chicago, and Edgar C. Olson, Waukegan, Ill., assignors to Kraftco Corporation, Chicago, Ill., a corporation of Delaware
Continuation-in-part of application Ser. No. 550,234, May 16, 1966. This application Sept. 24, 1969, Ser. No. 860,508
Int. Cl. B65b 25/06; B65g 47/24
U.S. Cl. 99—178                                  12 Claims

ABSTRACT OF THE DISCLOSURE

Method and apparatus for wrapping cheese slices individually in which the slices are aligned on a conveyor and then wrapped. Portions of the slices are elevated from the conveyor prior to wrapping to reduce frictional forces so that alignment of the slices is facilitated. A preferred method of elevating the slices is the forming of a cushion of air beneath them.

---

This application is a continuation-in-part of our co-pending application, Ser. No. 550,234, filed May 16, 1966, now abandoned.

The present invention relates generally to cheese packages and, more particularly, to an improved method and apparatus for manufacturing a cheese package. The present invention has particular application to the packaging of slices of cheese in which each slice is individually wrapped in a flexible wrapping material which is substantially impermeable to gas and moisture.

Various flexible sheet materials, plastic films, coated foils, etc., have been used in cheese packages for several reasons. First, they provide an inexpensive airtight wrapper which will maintain the perishable cheese in a state of freshness for a relatively long period of time. Second, such wrapping materials provide a highly attractive package and, when transparent films are used, the product may be viewed by the consumer while the product is still in the package.

Presliced cheese is a readily saleable item due to the ease with which it may be used in the preparation of food, both at home and on a commercial basis in restaurants, etc. Unfortunately, thin slices of cheese have a tendency to dry out upon exposure to the atmosphere. Thus, once a package of cheese slices is opened, if the entire contents are not utilized in a relatively short period of time, the quality of the cheese slices may deteriorate. It is, accordingly, desirable that the slices of cheese be individually wrapped and thus protected against deterioration even though the main package has been opened. Individual wrapping also facilitates separation of the cheese slices from each other and makes handling more sanitary. Wrapping individual cheese slices by hand, unfortunately, is inordinately expensive.

In a known process for the automated manufacture of cheese packages including individually wrapped "slices" of cheese, a continuous ribbon of cheese is extruded while hot into an elongated envelope formed of a wrapping material and the individual packages are subsequently formed by pressing and sealing opposite sides of the envelope to each other transversely of the elongated envelope. The envelope may then be cut centrally of the sealed strips to provide individual cheese packages. Packages manufactured in this manner are frequently quite difficult to open, sometimes resulting in damage to the cheese when the wrapper is removed. Furthermore, because the cheese is placed in the envelope while the cheese is hot, the cheese often adheres to the wrapping material.

Finally, the cheese "slices" in such prior art cheese packages are often of ill defined shape, and the general appearance of the cheese package is unattractive due to a certain amount of cheese being captured in the transverse seals.

It is an object of this invention to provide an improved method and apparatus for individually packaging cheese slices.

Still another object of the invention is to provide an improved cheese packaging method and apparatus in which the position of each cheese slice is controlled and proper orientation of the slice during the wrapping and sealing operations is insured.

Other objects of the invention and the various advantages thereof will become apparent to those skilled in the art from the following description taken in connection with the accompanying drawings wherein:

FIG. 1 is a perspective view of a packaging apparatus showing various features of the present invention;

FIG. 2 is an enlarged fragmentary side elevational view of a portion of the apparatus of FIG. 1;

FIG. 3 is a fragmentary top plan view, on a reduced scale, of the portion of the apparatus shown in FIG. 2;

FIG. 4 is a fragmentary end elevational view, partially in section, taken along the line 4—4 of FIG. 2;

FIGS. 5–7 are fragmentary sectional end views taken along the lines 5—5, 6—6, and 7—7 respectively of FIG. 3;

FIG. 8 is an enlarged fragmentary plan view of a further portion of the apparatus of FIG. 1;

FIG. 9 is a fragmentary sectional end view taken along the line 9—9 of FIG. 8;

FIG. 10 is a perspective view of a cheese package made in accordance with the improved method and apparatus; and FIGS. 11 and 12 are views of a modified apparatus similar to FIGS. 8 and 9, respectively.

The improved method and apparatus of the present invention are especially suited for forming a cheese package 11 (FIG. 10) comprising a single slice of cheese 12 and a sheet of flexible wrapping material 13 enclosing the cheese slice. The sheet of wrapping material is wrapped around the cheese slice and has two opposite edge portions 14 and 16 overlapped in an area which extends across one surface of the cheese slice. The sheet of wrapping material has each of its other two edge portions 17 and 18 flattened against itself and sealed. The overlapped edge portions are thereby held against each other to form a closure and protect the cheese slice from the atmosphere.

In the illustrated embodiment of the improved method of manufacture of the illustrated cheese packages 11, a plurality of individual slices of cheese 12 are moved in succession in a given direction as indicated by an arrow 10 in FIG. 1. A continuous sheet of flexible wrapping material 13 is moved in the same direction adjacent the moving slices and is formed around the moving slices such that the edge portions 14 and 16 of the continuous sheet overlap. Next, the continuous sheet is flattened against itself and sealed between the slices as indicated at 19 to form the sealed edge portions 17 and 18 which hold the overlapped edge portions against each other to impede the passage of air into the package. Prior to formation of the material around the slices, they are brought into alignment in their direction of travel so as to be properly oriented during such formation and the subsequent flattening and sealing between adjacent slices.

In performing the foregoing method, the apparatus of the invention includes a conveyor 42 for transporting the cheese slices 12 in succession but spaced apart relation from a supply station 21 to a wrapping station 22. Various rollers and guides 122, etc., are also provided for conducting a continuous sheet of flexible wrapping material 13 from a supply roll 23 through the wrapping station in the direction of movement of the cheese slices. A forming device 24 is provided at the wrapping station for turning the edge portions 14 and 16 of the continuous sheet under the cheese slices and into an overlapping relationship with each other. After leaving the wrapping station, a flattening and sealing device 26 is provided for flattening the continuous sheet against itself at portions between the cheese slices and for sealing such portions. The alignment of the individual cheese slices in their direction of travel prior to their entry into the forming device is effected by an aligning device 27 which elevates portions of each slice with respect to the conveyor to reduce forces between the slice and the conveyor tending to maintain the slice stationary relative to the conveyor. Then, during such elevation, the device positions the slice laterally with respect to the conveyor.

Referring in more detail to the method of the invention, the individual slices of cheese 12 are moved in succession in the given direction indicated by the arrow 10 in FIG. 1. In the apparatus of the invention, such movement is accomplished by means of the conveyor 42. The continuous sheet of flexible wrapping material 13 is also moved in the same direction as the moving slices. The moving continuous sheet is brought to a position adjacent the slices, and in the apparatus shown this is accomplished by means of a plurality of rollers and guides and the forming device 24 which forms the sheet around the moving cheese slices such that the edge portions 14 and 16 of the continuous sheet 13 overlap.

In the apparatus shown, as may be seen from FIGS. 5 through 7, the forming device 24 acts as a guide to pass the flexible sheet along just above the moving cheese slices 12 and at the same time to guide the opposite edge portions 14 and 16 of the sheet down and under the moving cheese slices to an overlapped relationship. The movement of the edge portions 14 and 16 begins just subsequent to the position in FIG. 5. FIG. 6 shows the edge portions partially moved under the cheese slice, and FIG. 7 shows the edge portions in their overlapped relationship as the flexible sheet and the cheese slices leave the forming device. In effect, therefore, the overlapping of the edge portions causes the sheet to form a long, flat, continuous envelope with a longitudinal seam which is not sealed, only overlapped. The individual slices of cheese are spaced from each other along the length of the envelope.

It will be appreciated that, in order to avoid damage to the cheese slices during wrapping and in order that the wrapping be precisely formed around the cheese slice, which is limp and can offer no substantial bearing surface, it is important that the cheese slices first be aligned accurately with respect to the wrapping material. Naturally, precise positioning of the individual slices of cheese when they are placed upon the conveyor is a possible solution to the alignment requirement. As a practical matter, however, it is extremely difficult to automate such a precise placement operation. The method of the invention contemplates alignment of the slices in their direction of travel prior to the wrapping step. This separate alignment makes complete automation of the method of the invention more readily achievable.

The precise nature of the alignment, in the illustrated embodiment, involves the raising, at least partially, of each slice of cheese with respect to the conveyor to reduce forces tending to maintain the slice stationary relative to the conveyor, such forces resulting, for example, from friction or from the characteristics, including tackiness, of the slice. The forces are reduced far enough to permit the slice to be easily shifted relative to the conveyor and into its desired position. In the illustrated apparatus of the invention, positioning of each slice laterally of the conveyor for alignment in the direction of travel is accomplished by means of a pair of moving belts 67 and 68 disposed on opposite sides of the conveyor as shown in FIGS. 8 and 9.

The elevation of each slice in the preferred apparatus of FIGS. 1 through 9 is effected by rollers 59 (FIG. 8) which are located on opposite sides of the conveyor and raise the edge portions of the slice above the conveyor and by a cushion of air emanating from air tubes 62 on opposite sides of the conveyor between the rollers. In a modified apparatus of FIGS. 11 and 12, the conveyor is divided longitudinally into two laterally spaced sections 42b and a third set of rollers 59b is provided between the sections to raise the center portions of the slices while the outer rollers 59a raise the edges of the slices.

Generally, the apparatus constructed in accordance with the invention receives a succession of individual cheese slices 12 from a supply station indicated at 21 in FIG. 1. In FIG. 1, the supply station is represented by the portion of the supply conveyor ahead of the aligning device 27. It is contemplated that the individual slices of cheese be placed on the conveyor by suitatble automatic means, not illustrated.

The apparatus moves the individual cheese slices 12 to the wrapping station 22 where they are enclosed in the flexible sheet material 13. The individual slices are then sealed in the sheet material and the cheese packages 11 thus formed are cut apart at subsequent stations along the line of movementt of the sheet material and cheese slices. At the end of the automated line, means (not illustrated) may be provided for stacking the individual cheese packages and providing an outer wrap thereover, if desired. The apparatus of the invention is designed for placement in a continuous automated line which includes means for manufacturing the cheese slices and a complete packaging opeartion. Several of the machines may be utilized in a plurality of automated manufacturing lines.

The apparatus of the invention is provided with a frame 41 (FIG. 1) shaped to provide suitable support for all the operating elements of the machine and comprised of stainless steel or other suitable material. The apparatus includes the supply conveyor 42 (FIGS. 1, 2, 4 and 9) which carries the individual slices of cheese from the supply station 21 to the wrapping station 22. The supply conveyor is flexible and is provided with a plurality of transverse upstanding lugs 43. The lugs 43 help to locate the individual slices of cheese 12 longitudinally with respect to the conveyor. The conveyor is of the endless type and is driven by a link chain 44 (FIG. 9) having a plurality of support brackets 46 on alternate links thereof. The support brackets 46 are attached to the inside of the conveyor 42, that is, the side opposite the side where the lugs 43 are located.

The link chain 44, and therefore the conveyor 42, is driven and supported by a pair of toothed drive sprockets 47 (FIG. 2) only one of which is illustrated. The illustrated drive sprocket is mounted on and driven by a drive shaft 48 (FIGS. 2 and 4) journalled in the frame 41 by suitable bearing means, not shown. A drive motor, not shown, may be suitably connected to rotate the drive shaft 48 and, hence, the drive sprocket 47. Rotation of the drive sprocket 47 will move the link chain 44 and, hence, the conveyor 42 in a manner such that the individual slices of cheese are moved from the supply station 21 to the wrapping station 22.

As will become apparent subsequently, it is important that the individual cheese slices be precisely positioned on the conveyor 42 in order that they may be properly wrapped. It has been found that it is difficult to design automated equipment for placing individual cheese slices on the conveyor 42 with the precision desired. Accordingly, the aligning device 27 is provided between the supply station 21 and the work station 22 to provide the desired alignment of the individual cheese slices along their direction of travel as well as assist in proper location of each slice longitudinally of the conveyor. The preferred form of this aligning device is illustrated in detail in FIGS. 8 and 9.

The preferred aligning device 27 includes an elongated conveyor support and guide 51 extending in the direction of the conveyor 42 below the upper portion thereof. A raised track 52 extends the length of the guide 51 along the top surface thereof and the link chain 44 rides on this track. The track serves to prevent extreme lateral movement of the link chain and accurately positions the top portion of the conveyor 42 at a predetermined level. The guide 51 is supported in notches on the top edge of a pair of cross bars 53 which extend between a pair of L-shaped subframe channels 54 and 56. The subframe channel 54 is suitably attached to the frame 41 to thereby provide support for the entire aligning device, and both of the subframe channels extend generally parallel with each other and the track 52.

A pair of elongated roller support brackets 57 and 58, of L-shaped cross section, are supported in notches in the transverse cross bars 53 on opposite sides of the conveyor supporting guide 51. The brackets 57 and 58 each support a plurality of rollers 59, the latter being journalled in the respective support brackets by means of axles 61. The rollers are supported at a level such that the top portions thereof extend slightly above the level of the conveyor belt 42, as may be seen in FIG. 9, to elevate the side edge portions of each cheese slice relative to and out of engagement with the belt.

A plurality of curved air tubes 62 are spaced along the outer sides of the support brackets 57 and 58. The air tubes 62 are curved through a right-angle bend and have their extremities positioned in the spaces defined by the respective peripheries of the rollers 59. The air tubes are for the purpose of issuing a continuous flow of compressed air in a horizontal direction under the cheese slices on the conveyor. The rollers 59 raise the edges of the cheese slices 12 as shown in FIG. 9 so that air flowing from the air tubes 62 will impinge against the undersides of the slices and, in effect, form a cushion to float each slice and permit its bodily movement relative to the conveyor. Air is supplied to the air tubes 62 through a pair of manifold tubes 64, one on each side of the conveyor at the base of the air tubes 62. An inlet tube 66 depends from each of manifold tubes 64 and is coupled with a main air supply conduit 63. The latter is connected to a suitable source of pressurized air, not shown.

It will be noted from FIG. 9 that the conveyor 42 is narrower than the width of the cheese slices 12. As may be seen in that figure, when the cheese slices enter the aligning device, the edges thereof which extend over the sides of the conveyor 42 are raised up on the rollers 59. The air being forced out of the air tubes 62 enters the wedge-shaped space thus formed between the cheese slices 12 and the top surface of the belt 42 to form the cushion of air between the conveyor belt and the cheese slices. This cushion of air need not be sufficient to raise the cheese slices off the conveyor belt, but is perfectly sufficient to raise the cheese slices enough that they are easily displaced relative to the conveyor by light contact.

When the cheese slices are raised far enough to reduce frictional or other forces resulting from their engagement with the conveyor, they are movable longitudinally as well as laterally of the conveyor. Thus, if a slice it not positioned with its trailing edge in proper engagement with the next adjacent conveyor lug 43 trailing the slice but, for example, is spaced ahead of such lug, it may shift rearwardly along the conveyor and into the proper position against the lug.

Contact with the edges of the cheese slices 12 for purposes of shifting the slices laterally of the conveyor is made in the illustrated apparatus by a pair of continuous alignment belts 67 and 68 disposed on opposite sides of the conveyer 42. These belts 67 and 68 are disposed to have their innermost surfaces precisely aligned with the wrapping station in accordance with its requirements. Three belt pulleys are in contact with each of the belts 67 and 68. Thus, belt 67 rides on pulleys 69, 71 and 72, whereas the belt 68 rides on the pulleys 73, 74 and 76. Pulleys 69 and 73 are the largest of the three pulleys in contact with each alignment belt and are mounted, respectively, on pulley shafts 77 and 78.

The pulleys 69 and 73 function to drive belts 67 and 68, respectively. To this end, the shaft 77 is journalled in a bearing housing 75 supported on the subframe channel 54. A bevel gear 81 is secured to the lower end of the shaft 77 and is in engagement with a bevel gear 82 mounted on a drive shaft 79. Thus, the shaft 77 is drivingly coupled to the drive shaft 79. In a similar manner, the shaft 78 is journalled in a bearing housing 80 secured to the subframe channel 56 and has a bevel gear 83 attached to its lower end. The bevel gear 83 is in engagement with a bevel gear 84 drivingly secured on the drive shaft 79. Thus, rotation of the drive shaft 79 will cause rotation of the pulleys 69 and 73, the former in a counterclockwise direction and the latter in a clockwise direction as seen in FIG. 8.

The drive shaft 79 carries a gear 86 at one end and is journalled in the subframe channels 54 and 56 by means of a pair of bearing housings 87 and 88. Bushings 89 and 91 extend inwardly from the bearing housings 87 and 88, respectively, and operate to space the respective bevel gears 82 and 84 the required distance from the subframe channels. An idler shaft 94 (FIG. 8), journalled in two bearing housings 96 and 97 on the frame structure 41, is positioned parallel with the drive shaft 79. The idler shaft 94 carries a pair of idler gears 98 and 99 on opposite ends thereof. A gear box 92 is secured to the subframe channel 54 and encloses the gears 86 and 98. A gear 101 secured to a shaft, not shown, journalled in a bearing housing 102 operates to transmit power from a driving motor through a suitable torque transmission arrangement, also not shown. It is preferred that the gear 101 be driven from the same motor as that which drives the drive shaft 48 in order that the movement of the alignment belts 67 and 68 may be precisely synchronized with the conveyor belt 42.

The third or intermediate pulleys 71 and 74 for the two alignment belts 67 and 68 are rotatable mounted on a pair of spindles 103 and 104, respectively. The spindles 103 and 104 are not shown in FIG. 9 for the purposes of clarity, but are mounted and accurately located in the subframe channels 54 and 56. The third pulleys are provide to cooperate with the drive pulleys 69 and 73 and the idler pulleys 72 and 76 and support the belts for movement from points spaced apart a greater distance than the width of a cheese slice adjacent the idler pulleys, then toward each other in converging relation in the direction of conveyor travel to a spacing equal to the width of a cheese slice at the third pulleys, and finally in parallel with each other and the direction of travel between the third pulleys and drive pulleys at the spacing of the slice width. With this arrangement and with the parallel portions of the belts spaced equally from the adjacent edges of the conveyor, any slice not centered on the conveyor or having its edges out of parallel with the conveyor edges, will engage one of the belts where the belts converge and that belt will tend to shift the slice into a centered position on the conveyor with the side edges of the slice engaging and parallel to both belts as it moves with the belts where they are parallel.

Tension on the belts 67 and 68 is regulated by adjustment of the idler pulleys 72 and 76. These pulleys are mounted on spindles 106 and 107, respectively, and are separated from the top of the respective channels 54 and 56 by washers 108 and 109. The lower ends of the spindles 106 and 107 are secured in the respective subframe channels by means of lock nuts 111 and 112. Slots 113 and 114 are provided in the subframe channels 54 and 56, respectively, to permit the location of the spindles 106 and 107 to be varied when the lock nuts are loosened and thus regulate the tension on the belts 67 and 68.

The manner in which the apparatus of the invention moves the continuous sheet of flexible material 13 through the wrapping station 22 is seen best in FIG. 1. The continuous sheet of flexible material is taken off a supply roll 23 mounted on a spindle secured to the frame 41. The film is passed down over an idler roller 123 and around approximately 270° of the periphery of a drive roller 122. The flexible sheet material is then passed over a pressure roller 124 which forces the film against the periphery of the drive roller 122 and which also engages the idler roller 123 to rotate same. The drive roller 122 is carried on a drive shaft journalled in the frame 41 and driven by a suitable motor, not shown. After passing around the pressure roller 124, the continuous sheet of flexible material is passed around two other idler rollers 126 and 127 and down into the forming devices 24. All of the idler rollers 123, 126 and 127 and the pressure roller 124 are mounted on suitable spindles supported by the frame 41. After entering the forming device, the flexible material is wrapped about the individual slices of cheese, as will be described subsequently, as it is drawn through the forming device by means also subsequently described.

Referring now to FIGS. 2 through 7, the details of the forming device 24 may be seen. The forming device is comprised of an elongated top plate 131 which is suspended by a mounting plate 132 (FIG. 1) secured to the frame 41 by a pair of support arms 133. A pair of sides 134 and 136 extend downwardly from and are secured to the top plate as in the case of the side 136 which is shown as being secured to the top plate by means of a pair of wing nuts 139 (FIG. 2) mounted on threaded studs 138 extending outwardly from the edge of the top plate. Suitable slots 137 are provided in the side 136 to permit vertical adjustment of the position of the side. The front part of the sides 134 and 136 are chamfered at 141 up to the lower edge of the top plate 131. This helps in guiding the material as will be more fully explained subsequently.

Two horizontal shelves 142 and 143 extend inwardly from the lower edges 141 of the sides 134 and 136, respectively, of the forming device 24 (FIG. 4) and may be formed as integral lateral extensions of the lower extremities of the sides. As best seen in FIG. 3, the horizontal shelves 142 and 143 are tapered and increase gradually in width in the direction of movement of the flexible wrapping material with respect to the forming device, that is, to the right as viewed in FIG. 3. The portions of the shelves 142 and 143 toward the right end of the forming device 24 as viewed in FIGS. 3 and 7 are disposed at different levels and overlap. The wing nuts 139 may be loosened to permit vertical movement of the side 136 in the slots 137 and thus permit adjustment of the distance between the horizontal shelves 142 and 143 in their overlapped areas. As will be explained in greater detail subsequently, the horizontal shelves operate to wrap the edge portions 14 and 16 of the continuous sheet of material 13 under the individual cheese slices 12.

A delta-shaped guide plate 144 extends upwardly from the leading edge of the top plate 131 for guiding the material into the forming device 24. The guide plate is mounted to the top plate by means of a pair of angle brackets 146 and 147 (FIGS. 2 and 4) extending from the lower edge of the guide plate and integral therewith. The angle brackets 146 and 147 are bolted in mating recesses provided near the front edge 148 of the top plate in the lower side thereof. The front edge of the top plate is chamfered to the angle desired for the disposition of the guide plate, and the guide plate bears against this chamfered surface. The flare of the guide plate is selected to guide the sheet material down to the chamfers 141 of the sides 134 and 136 over which it passes into the forming device.

A notch 151 is provided in the front edge 148 of the top plate 131 between the two angle brackets 146 and 147 of the guide plate 144. A support bracket 152 is mounted on the guide plate near the top edge thereof and a pair of identical support arms 153 and 154 are pivotally mounted on the support bracket 152. A pressure roller 156 is rotatably mounted between the lower extremities of the two support arms 153 and 154 and is disposed in the notch 151. A lever arm 157 is rigidly attached to the support arm 153 and extends generally normal with the support arm 153. A coil spring 158 is secured to the end of the lever arm, and the opposite end of the spring is secured to a spring bracket 159 bolted on the top surface of the top plate 131. A cross bar 161 extends between the two support arms 153 and 154 intermediate the ends thereof. The cross bar 161 carries an adjusting screw 162, the tip of which is in engagement with the guide plate 144. The screw 162 permits adjustment of the precise position of the roller 156 in the notch 151 and the roller is biased in this position by the spring 158. The roller helps to adhere the material to the cheese as it is entering the forming device 24 and regulation of the position of the roller for optimum characteristics may be accomplished empirically.

In addition to the pressure roller 156, the forming device 24 includes a pair of additional pressure rollers 163. The pressure rollers 163 are provided on the underside of the forming device for maintaining tension in the sheet material 13. The pressure rollers 163 are mounted on a common shaft 164 which extends between a pair of identical arms 166. The arms 166 project rigidly from a sleeve 167 (FIG. 4) which is journal mounted on a shaft 168 secured to a plate 169 (FIG. 3). A balance arm 171 (FIG. 2) extends from the sleeve 167 intermediate the two arms 166 and in the opposite direction from the sleeve. A weight 172 is positioned adjustably on the arm 171 to vary the force with which the rollers 163 bear against the underside of the two horizontal shelves 142 and 143.

Referring to FIG. 2, the plate 169 carrying the shaft 168 for the pressure rollers is adjustably mounted to permit the roller to be moved away from the former for threading the wrapping material through the former. This mounting includes a plate 173 welded to a wall of the frame structure 41 and supporting a horizontal guide post 174 which extends from the plate 173 into a horizontal slot 176 in the plate 169. A threaded stud 178 on the fixed plate 173 extends through another horizontal slot in the plate 169 and the plate 169 is clamped to the fixed plate 173 by means of a clamping nut 177 turned on the threaded stud 178. Thus, the clamping nut 177 may be tightened or loosened to hold the plate 169 in fixed position or permit its movement with respect to the plate 173.

In order to facilitate adjustment of the pressure roller support plate 169, a horizontal adjusting sleeve 179 is journaled eccentrically on a horizontal pivot post 181 projecting rigidly from the plate 169. The outer periphery of the sleeve engages another post 182 projecting outwardly from the plate 173 and an adjusting handle 183 projects radially from one end of the adjusting sleeve 179. Thus as will be apparent from FIG. 2, when the adjusting handle 183 is turned to pivot the adjusting sleeve 179 about its off-center post 181 and relative to the post 182 on the fixed plate 173, the plate 169 will be moved with respect to the plate 173 to shift the pressure roller away from the former to facilitate threading of the film of wrapping material.

In performing the wrapping operation, the continuous sheet material 13 and the individual slices of cheese 12 enter the forming device 24 both moving in the same direction. The sheet material has been threaded through the forming device so that the center of the sheet passes across the underside of the top plate 131, down the inner surfaces of the side walls 134 and 136, across the upper surfaces of the horizontal shelves 142 and 143, and down and around the inner edges thereof. Because of the taper of the forward portions of the horizontal shelves, there is room between the inner edges thereof such that the conveyor 42 may pass partially into the forming device. Thus the conveyor will carry the cheese slices into the forming device. It will be noted that the edges of the cheese slices extend beyond the edges of the conveyor 42. Thus, as may be seen from FIG. 6, by the time the effective termination point of the conveyor 42 is reached, the edges of the cheese slices have ridden up on to the wrapping material disposed on the upper surfaces of the horizontal shelves 142 and 143. Thus, the material itself will serve to carry the individual slices of cheese through the forming device once this point has been reached.

As may be seen from FIG. 7, once the cheese slices 12 and the sheet material 13 emerge from the rear end of the forming device 24, the edge portions 14 and 16 of the sheet material have been wrapped around and under the slices of cheese. The result is that when the choeese slices and the wrapping material emerge from the rear end of the forming device, the individual slices of cheese are distributed, spaced from each other, along the length of a longitudinal envelope having an unsealed seam running the length thereof. The ability to adjust the spacing between the horizontal shelves by means of the wing nuts 139, and to adjust the pressure and position of the pressure rollers 156 and 163, coupled with the precise positioning of the guide plate 144, enables these various parameters to be adjusted for precise envelope formation.

Returning now to FIG. 1, the sealing and cutting operations of the apparatus are shown schematically. A suitable conveyor 184 is provided for supporting the longitudinal envelope of sheet material 13 and the individual cheese slices 12 after such leave the forming device 24. Upon reaching the sealing station, the portions 19 of the envelope between the individual slices of cheese are pressed against each other and a light heat seal is applied. This is accomplished by a flattening and sealing device 26 which may be of a suitable construction known in the art.

After passing the sealing device 26, a pair of rotary wheels 186 are positioned to engage opposite sides of the moving envelope. These wheels operate not only to draw the envelope of sheet material 13 through the forming device 24, but also carry cutter blades 187 thereon for cutting the sheet material centrally of each of the transverse heat seals made by the sealing device 26. The result is a plurality of individual cheese packages as illustrated in FIG. 1.

Instead of being raised by a cushion of air from the tubes 62, the center portions of the slices 12 in the aligning device 27 may be raised with respect to the conveyor by other means such as a third set of center rollers 59b coaxial with the spaced equidistantly from rollers 59a which engage and raise the side edge portions of the slices. Such a modified apparatus is shown in FIGS. 11 and 12 where parts similar to parts in FIGS. 1 to 9 bear similar reference numerals with the suffix a. In the modified apparatus, the construction and support of the aligning belts 67a and 68a and the side rollers 59a is the same as in the preferred construction of FIGS. 1 to 9. To accommodate the third set of rollers, however, the conveyor is divided into two narrow sections 42b, each located between the center rollers and one row of outer rollers. In construction and operation, the narrow sections are similar to the conveyor 42 of the preferred construction including spaced lugs 43b, link chains 44b, and guides 51b with raised tracks 52b. The center rollers 59b are constructed and mounted in a manner similar to the side rollers 59a.

Referring to FIG. 12, it will be seen that the uppermost surfaces of the center rollers 59b lie in the same plane as the tops of the side rollers 59a, that is, slightly above the surface of the conveyor sections 42b which engage the undersides of the cheese slices. Thus, as each cheese slice advances with the conveyor and between the aligning belts 67a and 68a, the side edge portions and center portion of each slice are raised out of contact with the upwardly facing surfaces of the conveyor sections 42b so as to reduce the forces between those surfaces and the slice tending to drag the slice along with the conveyor. The slice thereby is freed sufficiently to permit lateral shifting by the aligning belts as well as longitudinal shifting into proper position with respect to the next adjacent lug 43b behind the slice in the direction of travel. As the slice leaves the belts, its side edges should be aligned precisely with respect to the slices preceding it the same as in the preferred apparatus.

From the foregoing discussion, it will be appreciated that the improved method of the invention, by insuring accurate positioning of the slices as they are advanced into the wrapping and sealing operations, provides a successful way in which limp individual slices of cheese may be wrapped without incurring damage. The individual slices may be wrapped while cool enough so as not to become bonded to the wrapping material, nor do they become mashed in the sealed areas to present an unsightly appearance. The improved apparatus makes possible high production rates in carrying out the method of the invention previously described. Also, the apparatus provides for careful and precise handling of the cheese slices so that they incur no damage and so that the wrapping is carried out accurately and quickly.

Various embodiments of the invention and modifications thereof other than those shown and described herein will be apparent to those skilled in the art from the foregoing description and modifications and are intended to fall within the scope of the accompanying claims.

What is claimed is:

1. A method of packaging slices of cheese to provide individual packages each containing a single slice, said method including the steps of supporting a plurality of individual slices on an upwardly facing surface of a conveyor in spaced-apart relation to form a row extending in a given direction, moving the slices in said direction by means of said conveyor, aligning the slices in their direction of travel by elevating portions of the slices upwardly with respect to the conveyor so as to reduce the forces tending to maintain the slices stationary relative to the conveyor while at the same time engaging the side edges of the slices and thereby shifting nonaligned slices laterally relative to the conveyor and into alignment with each other, and enclosing each moving aligned slice in a flexible wrapping material.

2. A method in accordance with claim 1, including the step of directing air against the undersides of the moving slices to form a cushion of air beneath the slices permitting shifting of slices relative to the conveyor.

3. A method in accordance with claim 1 in which side edge portions of the moving slices are raised out of contact with the conveyor and air is directed against the undersides of said raised edge portions to form beneath the slices a cushion of air permitting the slices to shift relative to the conveyor.

4. An apparatus for packaging slices of cheese to provide individual packages each containing a single slice, said apparatus comprising an elongated longitudinally moving conveyor for supporting a plurality of individual slices of cheese in spaced-apart relation in a row extending in the direction of movement of the conveyor, means for elevating portions of the slices relative to the conveyor so as to reduce the forces between the slices and the conveyor tending to maintain the slices stationary relative to the conveyor, means for engaging side edges of the slices while said portions are elevated and applying a lateral shifting force to those slices not in alignment, and means for enclosing each moving aligned slice in a flexible wrapping material.

5. The apparatus of claim 4, in which said elevating means includes movable members supported above and on opposite sides of said conveyor for engagement with side edge portions of said slices to raise them above the conveyor and means for directing jets of air against the undersides of said raised edge portions to form beneath the slices a cushion of air permitting the slices to shift relative to the conveyor.

6. The apparatus of claim 4 in which said conveyor is divided longitudinally into at least two sections spaced laterally of said direction of movement and said elevating means includes movable members supported above and on opposite sides of said conveyor and between said sections thereof for engagement with side edge and central portions of said slices to raise them above the conveyor thereby reducing said frictional forces.

7. The apparatus of claim 6 in which said movable members are rollers.

8. The apparatus of claim 4 in which said elevating means includes means for directing air under pressure against the undersides of said slices to form beneath the slices a cushion of air permitting the slices to shift relative to the conveyor.

9. The apparatus of claim 4 in which said means for engaging side edges of slices and applying a lateral shifting force thereto comprises a pair of continuous belts supported on opposite sides of said conveyor and moving in said direction of conveyor movement and at a speed synchronized with the conveyor speed.

10. The apparatus of claim 9 characterized in that said belts, in said direction of conveyor movement, first converge from a lateral spacing greater than the width of said slices to a spacing equal to such width and then move in parallel with each other at the spacing equal to the slice width.

11. The apparatus of claim 4 in which said enclosing means includes a forming means comprising an elongated top plate having a pair of downwardly extending side walls and a pair of horizontal shelves extending inwardly from the lower portions of said side walls and having overlapping portions, an upwardly flared guide plate secured to the front of said top plate, said top plate having a notch centrally of the front edge thereof, a pressure roller disposed in said notch for adhering wrapping material to the cheese to maintain registration, and means for adjusting the position of said pressure roller.

12. Apparatus in accordance with claim 11 wherein said forming means includes a pair of pressure rollers adjacent the underside of said horizontal shelves for obtaining a tight wrap on the cheese slices.

References Cited

UNITED STATES PATENTS

| | | | |
|---|---|---|---|
| 2,919,990 | 1/1960 | Podlesak et al. | 99—178 |
| 2,951,324 | 9/1960 | Podlesak et al. | 53—112 |
| 3,022,613 | 2/1962 | Powers | 53—28 |

RAYMOND N. JONES, Primary Examiner

J. R. HOFFMAN, Assistant Examiner

U.S. Cl. X.R.

53—28, 180; 198—33